United States Patent Office 3,445,823

Patented May 20, 1969

3,445,823

MEMORY HAVING A MULTI-VALVED IMPEDANCE ELEMENT

Bent Scharøe Petersen, Arhus, Denmark, assignor to Danfoss A/S, Nordborg, Denmark, a company of Denmark Filed Feb. 4, 1965, Ser. No. 430,398
Claims priority, application Germany, Feb. 5, 1964, D 43,535
Int. Cl. H03k 17/76; G11b 5/64
U.S. Cl. 340—173 15 Claims

ABSTRACT OF THE DISCLOSURE

An electrical memory having bilateral solid state switching elements in a matrix configuration connecting input and output lines. The switching elements pass direct and alternating current and each consist of a polycrystalline material having a high resistance state and a low resistance state switching to the low resistance state upon application of a switching potential thereacross exceeding a switching threshold potential and switch to the higher resistance state upon application of a current exceeding a reset switching threshold current applied to the input and output lines.

The present invention relates to an electrical storage device and memory, in which a predetermined pattern of connections between inputs and outputs can be established, and the pattern of connection can easily be changed and replaced by a different pattern.

Computers and various control apparatus utilize partricular electrical connections in order to carry out assigned functions; these connections may remain established for a given period of time, and then may be changed by different connections to accomplish different functions. Thus, storage or memory of the particular connection enables the carrying out of predetermined sequences of operations.

In general, numerically operating apparatus contains a number of register elements which, together with the input signals, define the condition or state of the system. The sequence of the particular conditions or states of circuit arrangements and networks within the system, then determines its operation. Information for the arrangement or establishment of particular states within the system is retained and thus results in memory. Such information may be in a working memory, the particular condition of which is changed frequently; or it may be in a permanent memory which is arranged in the form of pre-wired or pre-arranged circuits; or it may be in form of a patch board in which the particular wiring arrangement can be changed by changing plug-in connections. Ordinarily, computer apparatus will contain all kinds of memories.

The semi-permanent form of memory is often a very desirable unit in a computer. A semi-permanent memory may be defined as a memory or storage device which retains its information until it is reprogrammed externally in a rather simple fashion, for example by change of a punch card, a plug or patch board, or by electrical means.

It is an object of the present invention to provide a memory and storage device in which particular connections forming an electrical network can be stored easily, and these connections changed and a different pattern of connection readily established.

It is a further object of the present invention to provide a solid state memory element which is easily manufactured, lends itself to mass production, and ready connection with input and output wiring or printed circuit connections.

Briefly, the invention, therefore, provides that all input and all output lines are connected to a solid state switching element which, when a potential in excess of a threshold is applied thereto, changes from a high resistance state to one of low resistance; and which, when a current is passed therethrough which exceeds a certain threshold value, again changes back to its high resistance state. An input device is then provided which permits selection of specific solid state switching elements in accordance with a desired pattern, to establish low resistance paths as desired.

A storage and memory device according to the present invention inherently contains all electrical connections. Whether these electrical connections become effective, that is whether they will be of low resistance value, will then depend upon the state of the particular solid state switching elements. It is thus possible to establish connections or break them. The solid state switching elements will retain the state of their resistance value, so that only short time pulses are necessary to establish, or change a pattern of connections, which pattern of connections, however, will remain once it has been set up.

In practicing the invention, it is desirable to place a non-linear element such as a rectifier in series with the solid state switching element. It is thus possible to utilize amplifiers and auxiliary equipment having impedances and transfer functions arranged for presently known registers or storage devices. The diodes are permanently connected, and are rendered effective or cut-off depending upon the desired pattern, by the solid state switching elements. The permanently connected diodes are thus switched, and rendered conductive, at the crossing points of a matrix by means of electrical impulses.

The switching impulses are preferably derived from a pulse source, having one terminal connected to one or more switches which connect to one or more input lines; and the other terminal connected also to one or more switches connectable to one or more of the output lines. By discrete choices of input switches and output switches, a single solid state switch element may be defined or selected within a matrix, and this single switching element will then receive a switching pulse. Of course, it is also possible to supply each solid state switching element with its own switching lines.

The switching elements used in the present invention are brought into their high resistance condition or state by means of a current in excess of a certain threshold value. It is thus possible to select, for erasing of the memory, or resetting it to zero, all those switching elements which are in their low resistance state and apply the erase current thereto. It is, however, much simpler to connect an erasing current source to all of the switching elements, either simultaneously or successively, in order to erase the contends of the entire memory. Those elements which are already in their high resistance state will not be affected.

The terms "potential source," and "current source" have been, and will be used in the device of the present invention. When considering a source of potential, the available voltage applied is of primary interest; the current to be supplied by this source is of secondary interest, and thus the internal impedance of such a potential source may be high. With respect to current sources, however, a comparatively high current is necessary, and the actual terminal potential is not too important. Thus, the current source should have a very low internal resistance.

Solid state switching elements utilized in the present invention consist primarily of tellurium with the addition of an element of Group IV of the Periodic Table of Elements. These switching elements are polycrystalline and thus do not have unidirectional current characteristics and are equally suitable for direct as well as for alternating current. When in their high resistance state, they have a resistance of several megohms, thus are practically an open circuit. In their low resistance state, their resistance is of one ohm or less, and thus does not represent a power load having substantial dissipation. The great difference between the resistance in the high resistance and the low resistance state affords a clear definition between the two states, and thus little ambiguity and low noise level. As an example, the mixture from which the polycrystalline body is made, may consist essentially of 90% tellurium, and 10% germanium. This mixture may be applied on a support plate, either by evaporation, sputtering, or from a melt. Before applying the mixture of tellurium and germanium, a group of wires is placed on the support. After having applied the mixture, a second group of wires, perpendicular to the first, is placed thereover. At the points where the wires cross, an element is formed. Only in the region where the two wires are superimposed will a current path be formed. The tellurium-germanium body will remain in its high resistance state with respect to adjacent wires; with respect to superimposed wires, however, it will switch from high resistance to low resistance.

The structure, organization and operation of the invention will now be described more specifically in the following detailed description with reference to the accompanying drawings, in which:

FIG. 5 is a top view of a memory section shown in FIG. 4, taken from the line 5—5 of FIG. 4 on.

Figure 1:
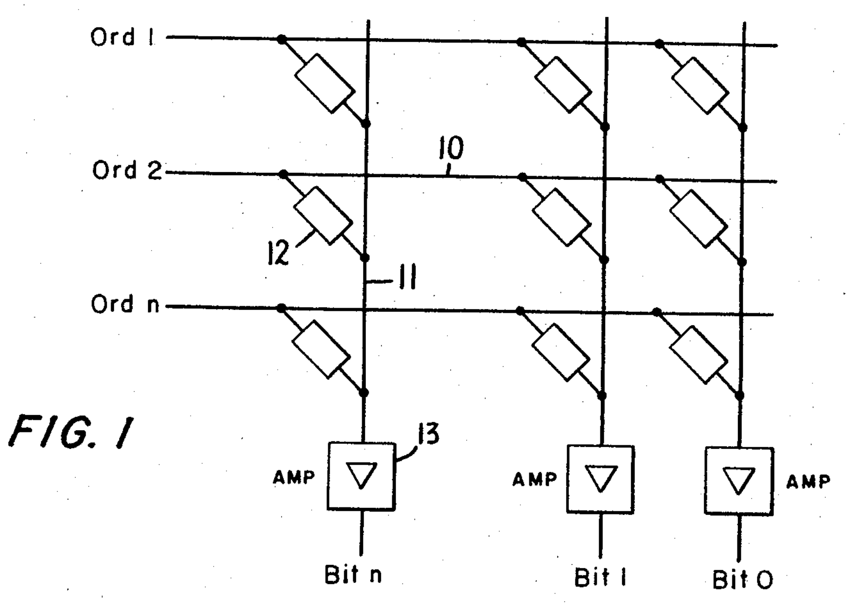
FIG. 1 illustrates the principle of a memory according to the present invention.

Referring now to FIG. 1, horizontal rows 10 represent the orders of words; vertical columns 11 represent bit positions in a binary system. If it is desired to read a word, then the respective line 10 is energized. Impedances 12 connect rows 10 with columns 11 at their cross-over points. These impedances may have two values—a very high one which is practically an open circuit and a very low one which is practically a direct connection. Impedances 12 may be resistive, may be formed by a condenser, or may have inductive coupling. Preferably these impedances are non-linear. Various forms of such impedances are known, for example magnetic cores.

In order to avoid coupling to words not desired, amplifiers schematically shown at 13 are connected to column lines 11. These amplifiers should have an input impedance which ideally is zero, or the coupling elements 12 must be highly non-linear. Couplings 12 often are in the form of diodes for a value 1, and an open circuit for a value of zero. Placing contacts in series with the diodes, for example as determined by the presence or absence of holes in tabulating cards in specific positions, then forms a memory, the program of which is determined by the tabulating card.

In accordance with the present invention, it is not necessary to place any outside contact elements such as tabulating cards, in series with the elements 12 at the cross-over point; nor is it necessary to provide magnetic coupling elements, such as cores, which are set in one magnetic state or another by magnetizing windings.

Figure 2:
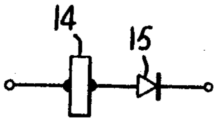
FIG. 2 illustrates a schematic switching element for the cross-over points, shown in block form in FIG. 1.
Figure 3:
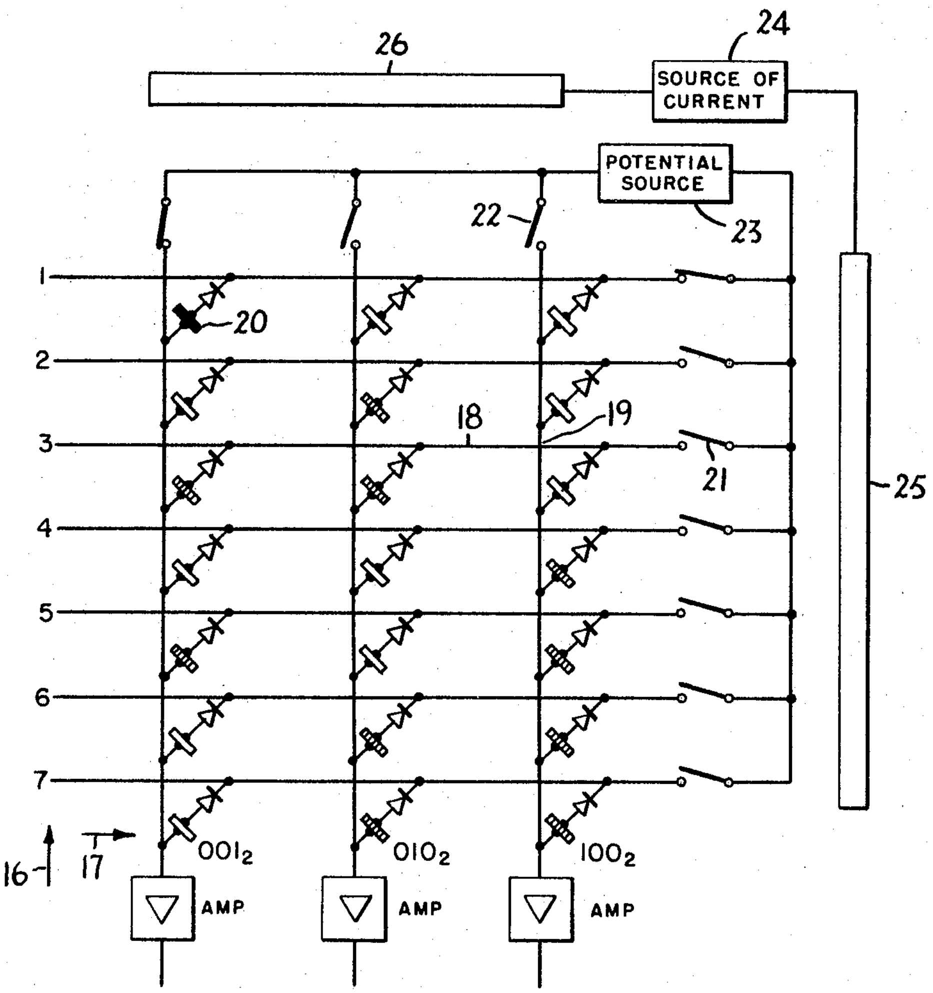
FIG. 3 shows a programmed memory in schematic representation.

Referring now to FIG. 2, a solid state switch 14, as previously mentioned, is placed in series with a diode 15 at the cross-over points in the position of the elements 12 of FIG. 1. The diode can be omitted for certain applications, e.g. if the impedance of amplifiers 13 can be matched to that of the switch element 14 without its presence. A complete memory matrix is illustrated in FIG. 3. Seven input rows 16 are shown, and three output columns 17. Each input row 16 has an individual line 18, and each output column has an individual output line 19. Each one of the input lines 18 is connected with each one of the output lines by means of a solid state element 20, in series with a diode, similar to the arrangement shown in FIG. 2. For purposes of illustration, let it be assumed that the blank elements 20 are in their high resistance state, and thus cut-off any current flow from row lines 18 to column lines 19. The cross hatched elements 20, or the entirely black element 20, however, are in their low resistance state and conductive.

The matrix of FIG. 3 thus is programmed as a decimal-binary converter. Decimal FIGURES 1 through 7 are shown in connection with row lines 16, while column lines 19 show the output in the binary system, the subscript 2 denoting that the system is to base 2. For example, to convert decimal 3 into binary form (011), output will have to be obtained from the first and second ones of column lines 17. Referring now to FIG. 3, it will be seen that the switch elements 20 interconnecting the row line 18 for numeral 3, and the column lines for the order 011 and 010 are in their conductive or low resistance state, while the element 20 for the order 100 is in its high resistance state. Thus output will be obtained from lines 001 and 010, giving the correct binary result, 011.

Rather than utilizing the memory element as a binary decimal converter, it can also be used as a distributor for pulses, or for current, for example to route control pulses to machine tool control systems, or to specific sub-routines of a computer.

It is very easy to change the distribution of current, or the code in which the output of a decimal-binary converter will appear. Each input row 16 is connected to a switch 21. Each input column 17 is connected to a switch 22. A source of potential 23, shown in schematic or block form because it can be any source of suitable potential even if it has substantial internal impedance, is connected to the switches 21, 22. Connecting a specific combination of switches 21 and 22 will then change the state of the specific solid state switching element at the crossing. Element 20, shown entirely in black, would be changed to its low resistance state if the switches 21, 22 are connected as shown. Connecting this switch into its low resistance state is necessary, for example, in a decimal-to-binary converter, to correctly convert the numeral 1 to binary 001.

In order to change the program, or change the code, and erase the setting of the matrix, a source of current 24 which has internally low impedance and capable of providing a substantial current is connected, for example by means of buses 25, 26, to all the row lines 18 and column lines 19. All of the solid state switching elements will thus revert back to their high resistance state, for later reprogramming by means of source 23 and switches 21, 22.

Figure 4:
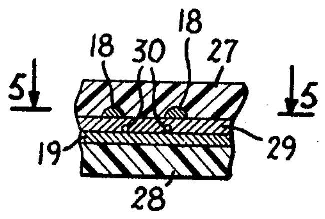
FIG. 4 is a cross-section through a memory element on a support plate.
Figure 5:
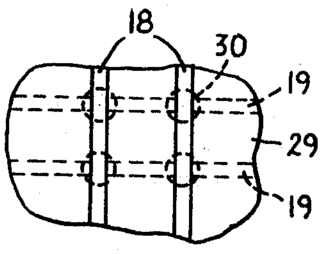

Referring now to FIGS. 4 and 5, input lines 18 are embedded in an insulator body 27. Output lines 19 are embedded in another insulator body 28. Sandwiched between both insulator bodies, and between the conductors, is the material forming the solid state switch, and consisting essentially of a polycrystalline mass of approximately 90% tellurium, and an additive taken from Group IV of the Periodic Table of Elements, such as germanium. The switching region from the high resistance state to the low resistance state upon application of a potential will only be within the approximate region of overlap of conductors 18 and 19 as shown by the lines 30 in FIGS. 4 and 5. Thus, the solid state switch elements are defined by the layer of tellurium, and additive material 29 at the cross-over point of conductors 18 and 19. The layer of material may be evaporated on a support 28 having the conductors 19 embedded therein sintered on, sputtered on, or applied by a melt.

*Additional description*

A memory type device is developed of a material which is similar to the threshold device, that means a device which switches on at a certain voltage and switches back to its insulating state.

A memory switch is a device which has two stable conditions, one where it is conducting, and one where it is non-conducting. In its non-conducting state the device or the material itself has a negative temperature coefficient resistance curve. If the element is provided with two electrodes, one on each side of the material, and a voltage is applied thereto, then the resistance will decrease. The material having a low heat conductivity this decrease of resistance will cause an increase in current through the device and an increase in temperature of the material or a certain part of the material, which will again cause a further decrease in resistance, until the material is fully conducting.

The material is in its normal non-conducting condition amorphus, glassy or polycrystalline; none of these words do, however, really describe the character of the material. The best word might be "glassy."

Upon a further increase in temperature the material becomes "plastic," and will change to a crystalline structure, where it becomes conducting.

The material itself could be an inorganic polymer or a material which could form glass or chain structure. Materials or compositions which are on the borderline of a glassy and crystalline structure might be preferred.

When the material has changed to the crystalline structure you may cool it again, but it still remains conducting; that means that the material is stable in this condition too. If you want to switch the element back to its non-conducting state you would have to increase the temperature above the temperature upon which the material is changed from an amorphus to a crystalline state. This can be done by applying an electric pulse to the circuit, which now has a low impedance or resistance. This pulse is of a very short duration and causes a further melting or more "plastic" structure of the material. At this stage the material changes from a melted or "plastic" condition where it might be crystalline to a melted or "plastic" condition where it is amorphus.

It is now possible—and has been proved by the element produced—that upon a very rapid cooling this amorphus condition will remain, even when it is cooled down, and as mentioned before this is a non-conducting structural state.

The theory for this device is not so well understood, but it is believed that it might be possible to have similar conditions as in polymer, where you can control the crosslinking between the chains of atoms in the material, or you can control the amount of crosslinkings by adding further material to the composition. Depending on the amount of crosslinkings you could have a bistable device, i.e. a memory, or you could have a threshold, i.e. a unistable device, if you have a big amount of crosslinkings.

The mechanism as such is not so well understood but might be one of the possible explanations for the operation of the device itself.

The material could e.g. be a mixture of germanium and tellurium, or the germanium could be substituted by silicon or other materials. Even on a further addition of other materials, e.g. arsenic, you could achieve both unistable and bistable devices, depending on the composition. In case of a glassy material you would, if you were inside the glass range have a tendency to get unistable switches, and if you are on the borderline you would get memory types of device.

Suitable materials for these devices could have an activating energy in the range of 1–1.5 e.v. Such devices may be produced as film units or as bulk materials to which suitable electrodes are applied. You can use a lot of kinds of electrode material, ranging from graphite, carbon, molybdenum, tungsten, silver and stainless steel. The film unit is normally made by evaporating the material upon a metal substrate, and on the film surface of the substrate you can apply a point electrode or spotter material on the film itself, but this disclosure is not limiting the electrode materials which could be used for this purpose.

The material of the device can be chosen out of a broad range of materials, e.g. materials which have covalent bindings mainly from the inorganic polymer type, or compositions which constitute glassy materials or semiconducting glasses.

I claim:

1. In an electrical memory, a plurality of input lines; a plurality of output lines; and means establishing connections between selected and predetermined ones of said input lines and output lines, said means comprising solid state switching elements capable of passing direct and alternating currents interconnecting said input and output lines in form of a matrix, said elements each consisting of polycrystalline material having a first, high resistance state, and a second, low resistance state, said elements switching from said first, high resistance state to said second, low resistance state, upon the application of a switching potential thereacross exceeding a switching threshold potential; and switching from the second, low resistance state to the first, high resistance state, upon application of a current therethrough exceeding a reset switching threshold current; and means selectively applying a voltage in excess of said switching thereshold potential to predetermined and selected input lines and output lines.

2. A memory as claimed in claim 1 including switch means associated with each of said input lines and said output lines, said switch means being adapted to be connected to a voltage source having a potential in excess of said switching threshold potential.

3. A memory as claimed in claim 1, including for each solid state switching element a diode in series therewith.

4. A memory as claimed in claim 1, a support, one of said plurality of lines being secured to said support; said polycrystalline material comprising a layer of polycrystalline tellurium with additives taken from Group IV of the Periodic Table of Elements applied over said lines on said support; and means securing said other plurality of lines over said layer in a direction intersecting the direction of the lines of said first plurality of lines.

5. A memory as claimed in claim 1, in which each of said switching elements comprises a polycrystalline layer of essentially tellurium, with additives taken from Group IV of the Periodic Table of Elements.

6. A memory as claimed in claim 5, in which each of said switching elements comprises essentially 90% tellurium, and 10% germanium formed as a polycrystalline layer.

7. In an electrical memory, a plurality of input lines; a plurality of output lines; and means establishing connections between selected and predetermined ones of said input lines and output lines, said means comprising solid state switching elements capable of passing direct and alternating currents interconnecting said input and output lines in form of a matrix, said elements each consisting of polycrystalline material having a first, high resistance state, and a second, low resistance state, said elements switching from said first, high resistance state to said second, low resistance state, upon the application of a switching potential thereacross exceeding a switching threshold potential; and switching from the second, low resistance state to the first, high resistance state, upon application of a current therethrough exceeding a reset switching threshold current; and means applying a current in excess of said reset threshold current to said input lines and output lines.

8. A memory as claimed in claim 7, said current in excess of said reset threshold current being applied simultaneously to all said input lines and all said output lines.

9. A memory as claimed in claim 7, including for each solid state switching element a diode in series therewith.

10. An electrical memory matrix comprising a first plurality of essentially parallel conductors; a second plurality of essentially parallel conductors arranged to extend at an angle with respect to said first plurality so as to form intersection points; and for each intersection a body of polycrystalline material consisting essentially of tellurim with additives taken from Group IV of the Periodic Table of Elements between said pluralities of conductors, said body of polycrystalline material forming switching elements at said intersection points between said conductors capable of passing direct and alternating currents.

11. An electrical memory matrix according to claim 10, said body consisting essentially of polycrystalline tellurim and germanium in the proportions of 90% tellurium and 10% germanium.

12. An electrical memory matrix as claimed in claim 10, one of said plurality of conductors being located on a support; said body being applied over said conductors on said support.

13. An electrical memory matrix as claimed in claim 12, said body being applied by evaporation.

14. An electrical memory matrix as claimed in claim 12, said body being applied by sintering.

15. An electrical memory matrix as claimed in claim 12, said body being applied from a melt.

References Cited

UNITED STATES PATENTS

| | | | |
|---|---|---|---|
| 2,784,389 | 3/1957 | Kelly | 340—173 |
| 2,938,194 | 5/1960 | Anderson | 340—173.2 |

TERRELL W. FEARS, *Primary Examiner.*

U.S. Cl. X.R.

340—166